United States Patent
Kim et al.

(10) Patent No.: US 8,744,713 B2
(45) Date of Patent: Jun. 3, 2014

(54) METHOD FOR CONTROLLING BRAKING OF VEHICLE

(71) Applicants: Hyundai Motor Company, Seoul (KR); Research Business Foundation SungKyunKwan University, Suwon-si (KR)

(72) Inventors: In Su Kim, Anyang-si (KR); Jong Yun Jeong, Suwon-si (KR); Dong Yoon Hyun, Seoul (KR); Hyun Soo Kim, Gwacheon-si (KR); Ji Weon Ko, Suwon-si (KR)

(73) Assignees: Hyundai Motor Company, Seoul (KR); Research Business Foundation Sungkyunkwan University, Suwon-Si (KR)

(*) Notice: Subject to any disclaimer, the term of this patent is extended or adjusted under 35 U.S.C. 154(b) by 0 days.

(21) Appl. No.: 13/708,818

(22) Filed: Dec. 7, 2012

(65) Prior Publication Data
US 2014/0074369 A1    Mar. 13, 2014

(30) Foreign Application Priority Data
Sep. 7, 2012    (KR) .................. 10-2012-0099329

(51) Int. Cl.
*B60L 7/22*    (2006.01)
*B60L 7/00*    (2006.01)

(52) U.S. Cl.
USPC ........................... 701/70; 701/80; 303/152

(58) Field of Classification Search
USPC .......... 701/70, 71, 73, 80, 82; 303/152, 150, 303/148, 149; 180/197, 165, 65.285, 65.29, 180/65.31; 318/72, 376; 903/947
See application file for complete search history.

(56) References Cited

U.S. PATENT DOCUMENTS

| | | | |
|---|---|---|---|
| 2004/0238244 A1* | 12/2004 | Amanuma et al. | 180/65.2 |
| 2012/0152633 A1* | 6/2012 | Tamura et al. | 180/89.13 |
| 2012/0160580 A1* | 6/2012 | Nakata | 180/65.29 |
| 2013/0066532 A1* | 3/2013 | Brown et al. | 701/70 |

FOREIGN PATENT DOCUMENTS

| | | | |
|---|---|---|---|
| JP | 5-161212 A | | 6/1993 |
| JP | 2003-102108 A | | 4/2003 |
| JP | 2004-268901 A | | 9/2004 |
| JP | 3689908 B2 | | 6/2005 |
| JP | 2006131194 A | * | 5/2006 |
| JP | 4039146 B2 | | 11/2007 |
| JP | 2008-179259 A | | 8/2008 |
| JP | 2011-223648 A | | 11/2011 |
| JP | 4901503 B2 | | 1/2012 |
| JP | 2012-25389 A | | 2/2012 |

* cited by examiner

*Primary Examiner* — Mary Cheung
*Assistant Examiner* — Rodney Butler
(74) *Attorney, Agent, or Firm* — Morgan, Lewis & Bockius LLP

(57) ABSTRACT

A method for controlling braking of a vehicle calculates a driver request braking deceleration and a current frictional coefficient of a road surface to obtain a vehicle deceleration corresponding to the coefficient of the road surface. A maximum deceleration at which a wheel lock does not occur upon braking only by a driving wheel is calculated when the driver deceleration is equal to or smaller than the coefficient by comparing the driver deceleration and the vehicle deceleration. A braking force is determined by distributing a regenerative braking force of the driving wheel and a frictional braking force of a driven wheel according to the coefficient when the maximum deceleration is smaller than the driver deceleration by comparing the maximum deceleration and the driver deceleration. A driving motor and a frictional braking device are controlled to generate the determined regenerative braking force and frictional braking force.

4 Claims, 4 Drawing Sheets

METHOD FOR CONTROLLING BRAKING OF VEHICLE

CROSS-REFERENCE TO RELATED APPLICATION

The present application claims priority of Korean Patent Application Number 10-2012-0099329 filed Sep. 7, 2012, the entire contents of which application is incorporated herein for all purposes by this reference.

BACKGROUND OF INVENTION

1. Field of Invention

The present invention relates to a method for controlling braking of a vehicle. More particularly, the present invention relates to method for controlling braking of a vehicle, which can minimize occurrence of wheel lock and interruption of regenerative braking by determining a regenerative braking force in consideration of conditions of a road surface and optimally distributing a braking force of front wheels and rear wheels in an eco-friendly vehicle that uses an electric motor as a driving source.

2. Description of Related Art

Generally, vehicles driven using an electric motor, i.e., eco-friendly vehicles such as pure Electric Vehicles (EV), Hybrid Electric Vehicles (HEV), and Fuel Cell Electric Vehicles (FCEV) perform regenerative braking upon braking of vehicles.

A regenerative braking system of eco-friendly vehicles improves fuel efficiency by converting kinetic energy of a vehicle into electric energy during braking of a vehicle, storing the electric energy in a battery, and recycling the electric energy to drive an electric motor when a vehicle drives (re-cycled electric energy is reused as kinetic energy of a vehicle).

In vehicles in which the regenerative braking is performed, a generative braking cooperative control technology is needed to allow the sum of a regenerative braking torque generated in an electric motor (driving motor) and a frictional braking torque generated in a frictional braking device (hydraulic braking device) to meet a driver request braking torque.

In this case, an electric braking force by generative operation and rotation resistance of a motor, i.e., a regenerative braking force and a frictional braking force by a frictional braking device need to be appropriately distributed.

Since a vehicle equipped with a driving motor on a front wheel performs regenerative braking only at the front wheel that is a driving wheel, a regenerative braking cooperative control technology of concentrating a braking force on the front wheel is applied in order to increase the recovery rate of energy.

FIG. 1 is a view illustrating a typical method for distributing a braking force, which shows an example of distribution of a regenerative braking force and a frictional braking force according to a driver request braking deceleration D.

As shown FIG. 1, when a driver request braking deceleration D is equal to or less than a first reference value $D_{f\_1}$, vehicle braking is allowed to be performed only by a regenerative braking force (maximum value of a regenerative braking force is $F_{f\_1}$) of a front wheel (driving wheel). On the other hand, when the driver request braking deceleration D is greater than the first reference value $D_{f\_1}$, the vehicle braking is allowed to be performed by the regenerative braking force $F_{f\_1}$ of the front wheel and a frictional braking force (a maximum value of a frictional braking force is $F_{r\_1}$ in the range of equal to or less than $D_1$) of a rear wheel (driven wheel).

Also, when the driver request braking deceleration D is greater than a second reference value $D_1$, the vehicle breaking is performed by allowing the sum of the regenerative braking force and the frictional braking force of the front wheel and the frictional braking force of the rear wheel to meet the total driver request braking force.

However, when a frictional coefficient of a road surface becomes lower than that of a dry road surface due to rain or snow, the breaking force concentrated on the front wheel causes a wheel lock of the front wheel to increase the braking distance. In this case, the regenerative braking is stopped while an Anti-lock Brake System (ABS) operates.

Thus, when the wheel lock of the driving wheel occurs due to a change of the frictional coefficient of the road surface during the regenerative braking operation, the motor is stopped. Accordingly, since the motor stops, the regenerative braking stops, and only the frictional braking is performed. In this case, due to the interruption of the regenerative braking, the recovery rate of energy may be reduced, and thus the fuel efficiency of a vehicle may be reduced.

In order to prevent this situation, a regenerative braking control strategy is needed to allow the regenerative braking not to stop as far as possible by distributing the braking force of the front wheel and the rear wheel in consideration of the conditions of the road surface.

In other words, although the determination of the generative braking force in consideration of the condition of the road surface and the appropriate distribution of the braking forces of the front wheels and the rear wheels have to be performed, the conditions of the road surface is not being considered at all in a related art. Accordingly, the improvement is needed.

The information disclosed in this Background section is only for enhancement of understanding of the general background of the invention and should not be taken as an acknowledgement or any form of suggestion that this information forms the prior art already known to a person skilled in the art.

SUMMARY OF INVENTION

The present invention provides a method for controlling braking of a vehicle, which can consider conditions of a road surface in determining a regenerative braking and distributing a braking force of front wheels and rear wheels during the driving of a vehicle, prevent the increase of the braking distance due to a wheel lock, and prevent reduction of fuel efficiency by minimizing the interruption of regenerative braking.

Various aspects of the present invention provide for a method for controlling braking of a vehicle, including: calculating a driver request braking deceleration and a current frictional coefficient of a road surface when there is a braking request from a driver to obtain a vehicle deceleration corresponding to the calculated current frictional coefficient of the road surface; calculating a maximum deceleration at which a wheel lock does not occur upon braking only by a driving wheel when the driver request braking deceleration is equal to or smaller than the frictional coefficient of the road surface by comparing the driver request braking deceleration and the vehicle deceleration; determining a braking force by distributing a regenerative braking force of the driving wheel and a frictional braking force of a driven wheel according to the frictional coefficient of the road surface when the maximum deceleration is smaller than the driver request braking deceleration by comparing the maximum deceleration and the driver request braking deceleration; and controlling a driving motor and a frictional braking device to generate the determined regenerative braking force and frictional braking force.

The method may include stopping regenerative braking when the driver request braking deceleration is greater than the frictional coefficient of the road surface by comparing the driver request braking deceleration and the vehicle deceleration.

The method may include performing braking of the vehicle only by regenerative braking of the driving wheel when the maximum deceleration is equal to or greater than the driver request braking deceleration by comparing the maximum deceleration with the driver request braking deceleration.

The method may include calculating the maximum deceleration corresponding to the current frictional coefficient of the road surface using data defining the maximum deceleration at which the wheel lock does not occur upon braking only by the driving wheel according to the frictional coefficient of the road surface.

The method may include determining the regenerative braking force of the driving wheel and the frictional braking force of the driven wheel according to the current frictional coefficient of the road surface using data defining distribution values of the regenerative braking force of the driving wheel and the frictional braking force of the driven wheel defined according to the frictional coefficient of the road surface.

The present methods and apparatuses have other features and advantages apparent from the accompanying drawings, incorporated herein, and below Detailed Description, which together serve to explain certain principles of the present invention.

Figure 1:
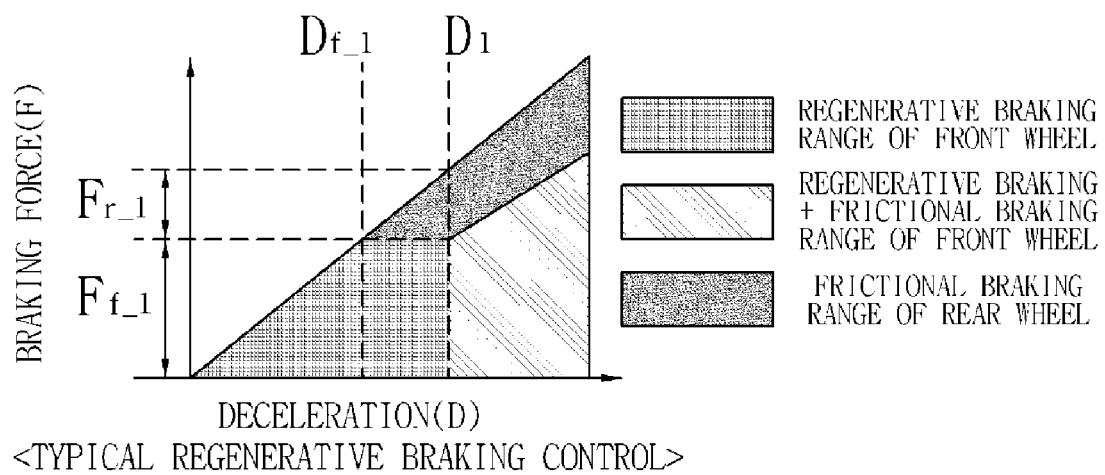
FIG. 1 is a view illustrating a typical method for distributing a braking force.

It should be understood that the appended drawings are not necessarily to scale, presenting a somewhat simplified representation of various features illustrative of the basic principles of the invention. The specific design features of the present invention as disclosed herein, including, for example, specific dimensions, orientations, locations, and shapes will be determined in part by the particular intended application and use environment.

In the figures, reference numbers refer to the same or equivalent parts of the present invention throughout the several figures of the drawing.

DETAILED DESCRIPTION

Reference will now be made in detail to various embodiments of the present invention(s), examples of which are illustrated in the accompanying drawings and described below. While the invention(s) will be described in conjunction with exemplary embodiments, it will be understood that present description is not intended to limit the invention(s) to those exemplary embodiments. On the contrary, the invention(s) is/are intended to cover not only the exemplary embodiments, but also various alternatives, modifications, equivalents and other embodiments, which may be included within the spirit and scope of the invention as defined by the appended claims.

It is understood that the term "vehicle" or "vehicular" or other similar term as used herein is inclusive of motor vehicles in general such as passenger automobiles including sports utility vehicles (SUV), buses, trucks, various commercial vehicles, watercraft including a variety of boats and ships, aircraft, and the like, and includes hybrid vehicles, electric vehicles, plug-in hybrid electric vehicles, hydrogen-powered vehicles and other alternative fuel vehicles (e.g., fuels derived from resources other than petroleum). As referred to herein, a hybrid vehicle is a vehicle that has two or more sources of power, for example both gasoline-powered and electric-powered vehicles.

The present invention is characterized in that braking forces of the front wheel and the rear wheel are distributed in consideration of conditions of the road surface, more specifically, a frictional coefficient of the road surface. Particularly, as described below, a driver request braking deceleration D and a frictional coefficient of the road surface may be calculated, and then, the driver request braking deceleration D, the frictional coefficient of the road surface, and the maximum deceleration at which a wheel lock does not occur during braking only by driving wheels may be used to determine a regenerative braking force of a driving wheel and a frictional braking force of a driven wheel.

Figure 2:
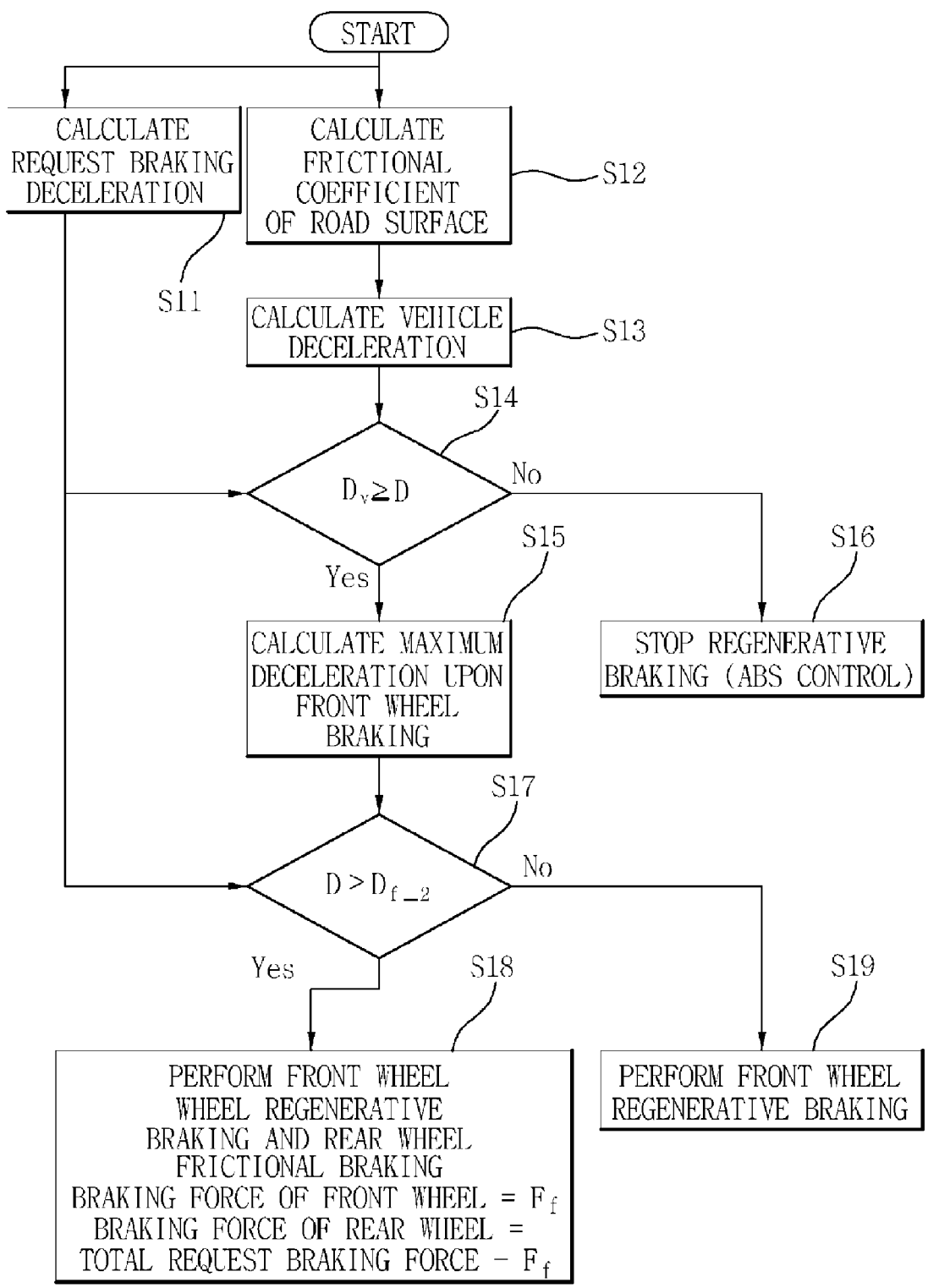
FIG. 2 is a flowchart illustrating an exemplary method for controlling braking according to the present invention.

FIG. 2 is a flowchart illustrating a method for controlling braking according to various embodiments of the present invention.

As shown FIG. 2, when there occurs a driver braking request according as a driver steps on a brake pedal during the driving of a vehicle, a controller for performing braking control according to various embodiments of the present invention may calculate a driver request braking deceleration D and a frictional coefficient $\mu$ of the road surface of a current driving road (S11 and S12).

Here, the driver request braking deceleration D may be already being used as a control variable for controlling braking of a vehicle. Since the calculation method and process thereof are variously known, the calculation method and process will not be limited to a specific type (well-known methods are selectively applied) in various embodiments of the present invention. Also, a detailed description of the calculation method and process will be omitted herein.

There is a well-known method that calculates the driver request braking deceleration D using information on a stepping quantity (stroke quantity) or a stepping force (pressure) of a brake pedal, and a current vehicle speed detected by sensors of a vehicle.

Also, since the frictional coefficient $\mu$ of the road surface is a control variable that is already being used for the Anti-lock Brake System (ABS) control, a detailed description of its calculation method and process will be omitted herein.

Although the controller can directly calculate the driver request braking deceleration D and the frictional coefficient $\mu$ of the road surface of a current driving road, the controller may receive this information from controllers of other vehicles that have already calculated and are using this information.

When the driver request braking deceleration D and the frictional coefficient $\mu$ of the road surface are calculated, a vehicle deceleration $D_V$ may be calculated from the frictional coefficient $\mu$ of the road surface of the current driving road (S13).

The vehicle deceleration $D_V$ may be calculated from map data information of FIG. 3 described below, in which the braking force of the front wheel (regenerative braking force) (value of horizontal axis) and the braking force of the rear wheel (the frictional braking force) (value of vertical axis) may be defined according to each frictional coefficient µ of the road surface.

Figure 3:
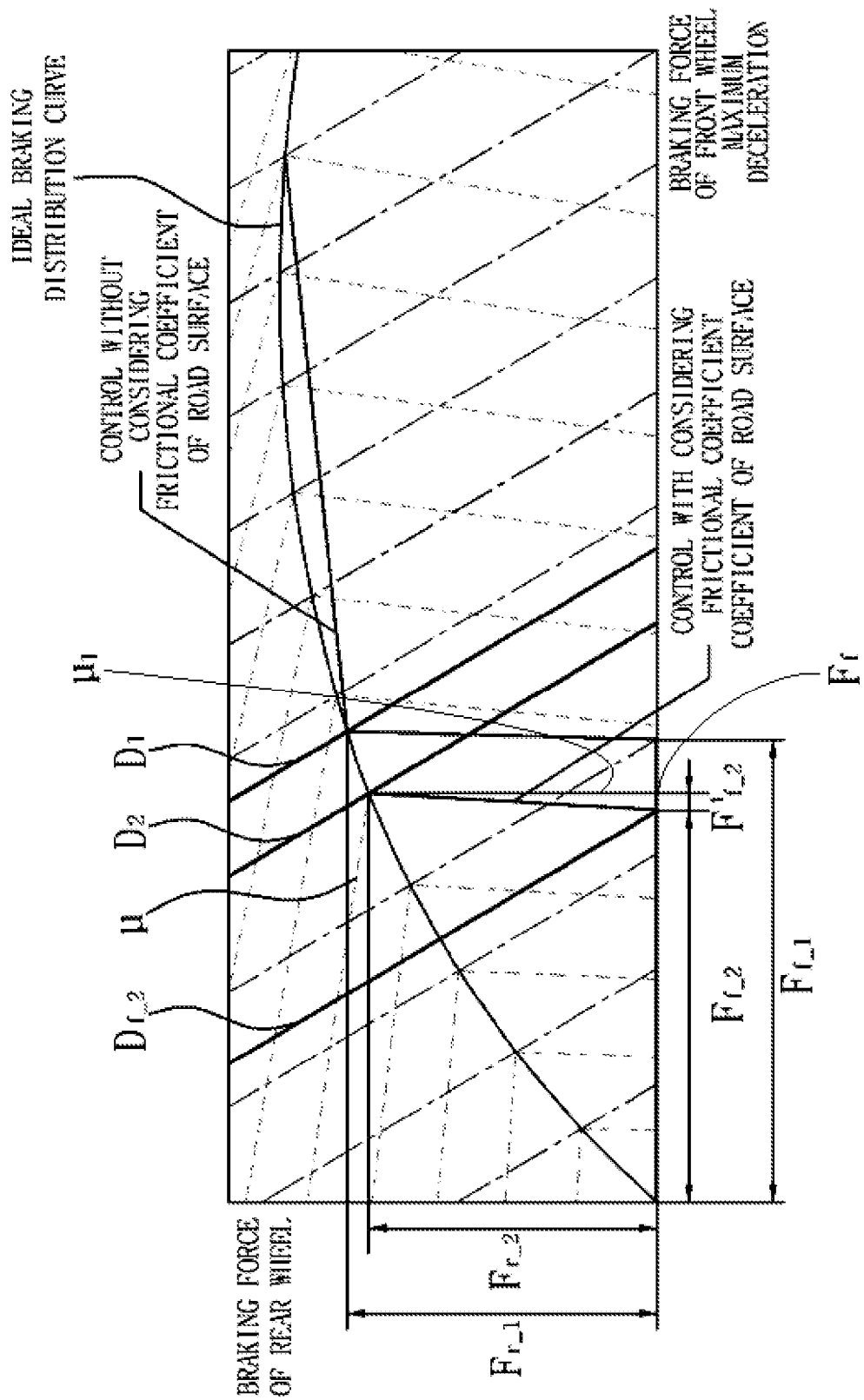
FIG. 3 is a view illustrating data available for distribution of a braking force according to the present invention.

For example, as shown in FIG. 3, when the current frictional coefficient of the road surface is $\mu_1$, a value of intersection point between the line µ1 and the horizontal axis (X-axis) may become a braking force of the front wheel, and a value of intersection point between the line µ1 and the vertical axis (Y-axis) may become a braking force of the rear wheel. The total braking force (vehicle braking force) of the front wheels and the rear wheels may be calculated by summing the braking forces of the front wheels and the rear wheels. Accordingly, a vehicle deceleration $D_V$ at a current frictional coefficient ($\mu=\mu_1$) of the road surface may be calculated using information (stored in a controller) on the inherent vehicle's specifications such as the total braking force and the vehicle's weight.

Thus, when the vehicle deceleration $D_V$ is calculated, the driver request braking deceleration D and the vehicle deceleration $D_V$ may be compared to determine whether to perform a regenerative braking (S14).

When the driver request braking deceleration D is greater than the vehicle deceleration $D_V$ at the current frictional coefficient µ of the road surface, the wheel lock of the driving wheel or the driven wheel may occur, causing the interruption of the regenerative braking (then, ABS control may be performed) (S16).

On the other hand, when the driver request braking deceleration D is equal to or less than the vehicle deceleration $D_V$, a maximum deceleration $D_{f\_2}$ at which the wheel lock does not occur upon braking by only the driving wheel (front wheel) may be calculated (S15). In this case, the determined maximum deceleration $D_{f\_2}$ may be compared with the driver request braking deceleration D (S17), and it may be determined whether to perform the vehicle braking by only a regenerative braking of the driving wheel or to perform the vehicle braking by a combination of the regenerative braking of the driving wheel and the frictional braking of the driven wheel.

Here, when the front wheel is equipped with a driving motor, the front wheel may become a driving wheel performing regenerative braking and the rear wheel may become a driven wheel. On the other hand, when the rear wheel is equipped with a driving motor, the rear wheel may become a driving wheel and the front wheel may become a driven wheel. Hereinafter, various embodiments in which the front wheel may become a driving wheel will be described.

When the maximum deceleration $D_{f\_2}$ upon front wheel braking is equal to or greater than the driver request braking deceleration D, the total driver request braking force can be met only by the regenerative braking force of the front wheel without occurrence of the wheel lock of the front wheel, and thus vehicle braking may be performed only by the regenerative braking of the front wheel (S19).

On the other hand, when it is determined that the maximum deceleration $D_{f\_2}$ upon front wheel braking is smaller than the driver request braking deceleration D, the wheel lock may occur when the driver request braking force is met only by the regenerative braking force of the front wheel. Accordingly, since frictional braking of the rear wheel is necessary to meet the driver request braking force while preventing occurrence of the wheel lock, the vehicle braking may be performed by a combination of the regenerative braking of the front wheel and the frictional braking of the rear wheel (S18).

In this case, in consideration of values reflecting the frictional coefficient µ of the road surface, the distribution of the regenerative braking force of the front wheel and the frictional braking force of the rear wheel may be determined. For this, information on equations for determining ideal distribution values of braking force according to the frictional coefficient µ of the road surface (information on equations for calculating the regenerative braking force of the front wheel and the frictional braking force of the rear wheel from the current frictional coefficient µ of the road surface), or information on map data (information on map data defining the ideal regenerative braking force of the front wheel and the ideal frictional braking force of the rear wheel defined according to the frictional coefficient µ of the road surface) may be pre-stored in a controller.

FIG. 3 is a view illustrating an exemplary form of map data information. In this case, an ideal braking-distribution curve, which can determine the ideal braking force of the front wheel (regenerative braking force) (value of horizontal axis) and the ideal braking force of the rear wheel (frictional braking force) (value of vertical axis), may be defined.

For example, as shown FIG. 3, when the current frictional coefficient µ of the road surface is µ1, a value ($F_f$) of horizontal axis (X-axis) of an intersection point between the line $\mu_1$ and the ideal braking-distribution curve may become an ideal regenerative braking force of the front wheel that does not generate a wheel lock.

This ideal regenerative braking force of the front wheel may be determined as a regenerative braking force of the front wheel at the current frictional coefficient µ of the road surface, and then a value obtained by subtracting the determined braking force of the front wheel from the total driver request braking force may be determined as a regenerative braking force of the rear wheel.

The frictional braking force of the rear wheel may be determined as a value ($F_{r\_2}$) of vertical axis (Y-axis) of an intersection point between the line µ1 and the ideal braking-distribution curve in the map data information of FIG. 3.

Accordingly, when the regenerative braking force of the front wheel and the frictional braking force of the rear wheel are determined, the regenerative braking of the driving motor and the frictional braking of the frictional braking device may be controlled such that the regenerative braking force of the front wheel and the frictional braking force of the rear wheel that are determined can be generated.

And, in the above process, the maximum deceleration $D_{f\_2}$ at which the wheel lock does not occur upon braking only by the front wheel (driving wheel) may be the maximum deceleration at which the wheel lock does not occur upon regenerative braking only by the front wheel (driving wheel) without braking of the rear wheel (driven wheel). As described above, after calculation of the maximum deceleration $D_{f\_2}$ upon front wheel braking, the maximum deceleration $D_{f\_2}$ may be compared with the driver request braking deceleration D. The maximum deceleration $D_{f\_2}$ upon front wheel braking can be a predefined value according to the frictional coefficient µ of the road surface in the map data information of FIG. 3.

That is, after the maximum deceleration $D_{f\_2}$ upon front wheel braking may be predefined as a value corresponding to the intersection point between the line of each frictional coefficient µ of the road surface and the horizontal axis (X-axis) in the map data information of FIG. 3, for example, when the current frictional coefficient µ of the road surface is µ1 in the map data information of FIG. 3, the maximum deceleration (shown as $D_{f\_2}$ in FIG. 3) corresponding to the intersection point between the line µ1 and the horizontal axis may be allowed to be calculated.

Accordingly, by comparing the calculated maximum deceleration $D_{f\_2}$ with a driver request braking deceleration D, it may be determined whether to brake a vehicle only by regenerative braking of the front wheel or to brake a vehicle by a combination of the regenerative braking of the front wheel and the frictional braking of the rear wheel (driven wheel).

Figure 4:
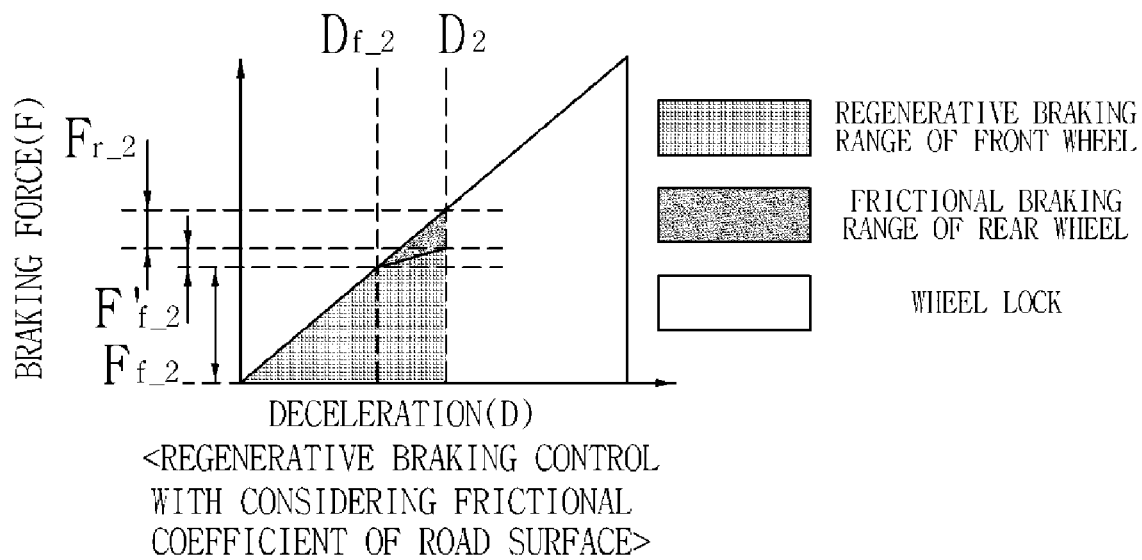
FIG. 4 is a view illustrating a distribution state of a braking force according to the present invention.

FIG. 4 is a view illustrating a distribution state of a braking force according to the control process of FIG. 2. As shown in FIG. 4, when the driver request braking deceleration D is equal to or smaller than a maximum deceleration $D_{f\_2}$ upon front wheel braking, the vehicle braking may be performed only by the regenerative braking of the front wheel.

On the other hand, when the driver request braking deceleration D is greater than the maximum deceleration $D_{f\_2}$ upon front wheel braking, the vehicle braking may be performed by a combination of the regenerative braking of the front wheel and the frictional braking of the rear wheel.

Thus, since determining of whether to perform regenerative braking and distribution of the braking force of the driving wheel and the driven wheel are performed in consideration of the frictional coefficient of the road surface, the increase of the braking distance due to occurrence of the wheel lock of the driving wheel (front wheel in the above example) and interruption of the regenerative braking can be effectively prevented, and the fuel efficiency of a vehicle can be increased.

The regenerative braking force of the driving wheel and the frictional braking force of the driven wheel may be determined according to the current frictional coefficient of the road surface in the process described above (when the frictional coefficient of the road surface changes, the regenerative braking force and the frictional braking force also change). When the vehicle braking is performed by the determined regenerative braking force and frictional braking force, the braking distance can be reduced due to absence of the wheel lock, and the regenerative braking may not be stopped.

Particularly, since the maximum regenerative braking can be performed in a range in which the wheel lock does not occur on roads with various frictional coefficients, the recovery rate of energy can be increased, and the braking distance can be reduced For convenience in explanation and accurate definition in the appended claims, the terms front or rear, and etc. are used to describe features of the exemplary embodiments with reference to the positions of such features as displayed in the figures.

The foregoing descriptions of specific exemplary embodiments of the present invention have been presented for purposes of illustration and description. They are not intended to be exhaustive or to limit the invention to the precise forms disclosed, and obviously many modifications and variations are possible in light of the above teachings. The exemplary embodiments were chosen and described in order to explain certain principles of the invention and their practical application, to thereby enable others skilled in the art to make and utilize various exemplary embodiments of the present invention, as well as various alternatives and modifications thereof. It is intended that the scope of the invention be defined by the Claims appended hereto and their equivalents.

What is claimed is:

1. A method for controlling braking of a vehicle, comprising:
    calculating a driver request braking deceleration and a current frictional coefficient of a road surface when there is a braking request from a driver to obtain a vehicle deceleration corresponding to a calculated current frictional coefficient of the road surface;
    calculating a maximum deceleration at which a wheel lock does not occur upon braking only by a driving wheel when the driver request braking deceleration is equal to or smaller than the frictional coefficient of the road surface by comparing the driver request braking deceleration and the vehicle deceleration;
    determining a braking force by distributing a regenerative braking force of the driving wheel and a frictional braking force of a driven wheel wherein the regenerative braking force is determined by changing a first regenerative braking force of the maximum deceleration that is determined according to the frictional coefficient of the road surface when the maximum deceleration is smaller than the driver request braking deceleration by comparing the maximum deceleration and the driver request braking deceleration;
    controlling a driving motor and a frictional braking device to generate the determined regenerative braking force and frictional braking force; and
    performing braking of the vehicle only by a regenerative braking force of the driving wheel when the maximum deceleration is equal to or greater than the driver request braking deceleration by comparing the maximum deceleration with the driver request braking deceleration.

2. The method of claim 1, comprising stopping regenerative braking when the driver request braking deceleration is greater than the frictional coefficient of the road surface by comparing the driver request braking deceleration and the vehicle deceleration.

3. The method of claim 1, comprising calculating the maximum deceleration corresponding to the current frictional coefficient of the road surface using data defining the maximum deceleration at which the wheel lock does not occur upon braking only by the driving wheel according to the frictional coefficient of the road surface.

4. The method of claim 1, comprising determining the regenerative braking force of the driving wheel and the frictional braking force of the driven wheel according to the current frictional coefficient of the road surface using data defining distribution values of the regenerative braking force of the driving wheel and the frictional braking force of the driven wheel defined according to the frictional coefficient of the road surface.

* * * * *